(12) United States Patent
Nethercutt et al.

(10) Patent No.: US 10,701,142 B2
(45) Date of Patent: Jun. 30, 2020

(54) SYSTEMS AND METHODS FOR LOAD BALANCING ACROSS MEDIA SERVER INSTANCES

(71) Applicant: Genesys Telecommunications Laboratories, Inc., Daly City, CA (US)

(72) Inventors: Glenn Thomas Nethercutt, Raleigh, NC (US); Roderick M. Francisco, Westfield, IN (US); Felix Immanuel Wyss, Zionsville, IN (US); K. William Woodward, Indianapolis, IN (US)

( * ) Notice: Subject to any disclaimer, the term of this patent is extended or adjusted under 35 U.S.C. 154(b) by 35 days.

(21) Appl. No.: 16/118,141

(22) Filed: Aug. 30, 2018

(65) Prior Publication Data

US 2019/0068699 A1    Feb. 28, 2019

Related U.S. Application Data

(60) Provisional application No. 62/553,083, filed on Aug. 31, 2017.

(51) Int. Cl.
*H04L 29/08* (2006.01)
*H04L 12/911* (2013.01)
*H04L 29/06* (2006.01)
*H04L 12/803* (2013.01)

(52) U.S. Cl.
CPC ........ *H04L 67/1031* (2013.01); *H04L 47/125* (2013.01); *H04L 47/70* (2013.01); *H04L 65/1083* (2013.01); *H04L 65/4015* (2013.01); *H04L 65/4069* (2013.01); *H04L 67/1008* (2013.01); *H04L 67/1029* (2013.01);
(Continued)

(58) Field of Classification Search
CPC .............. H04L 67/1031; H04L 47/125; H04L 65/4015; H04L 65/1083; H04L 69/14; H04L 67/1029; H04L 67/1008; H04L 47/70; H04L 67/32; H04L 67/14; H04L 65/4069; H04L 67/20
See application file for complete search history.

(56) References Cited

U.S. PATENT DOCUMENTS 9,569,277 B1    2/2017   Cropper et al.
2014/0304404 A1   10/2014   Marr et al.
(Continued)

FOREIGN PATENT DOCUMENTS

WO      2011041101 A1    4/2011

OTHER PUBLICATIONS

International Search Report and Written Opinion dated Jan. 3, 2019 in related PCT Application PCT/US2018/048950.

*Primary Examiner* — Michael A Keller

(57) ABSTRACT

A system and method are presented for load balancing across media server instances. In an embodiment, media is broken out into a multi-tenanted service allowing the media to be scaled independently of the number of organizations supported on a cloud-based collaboration platform. Scaling may occur in a scaling-out or a scaling-in operation. States for a media service may comprise in-service, quiescing, quiesced, failed, etc. The states may be used to monitor sessions associated with an instance and determine which media instances to terminate during a scaling-in operation. In an embodiment, new instances may be added to a collection of media instances in response to an increased workload in a scaling-out operation.

19 Claims, 10 Drawing Sheets

(52) U.S. Cl.
CPC .............. *H04L 67/14* (2013.01); *H04L 67/32* (2013.01); *H04L 69/14* (2013.01); *H04L 67/20* (2013.01)

(56) References Cited

U.S. PATENT DOCUMENTS

2015/0089034 A1* 3/2015 Stickle .................... H04L 41/00
   709/223
2016/0103717 A1* 4/2016 Dettori .................... G06F 9/542
   719/318
2016/0164797 A1* 6/2016 Reque .................... G06F 9/5077
   718/1

\* cited by examiner

SYSTEMS AND METHODS FOR LOAD BALANCING ACROSS MEDIA SERVER INSTANCES

CROSS REFERENCE TO RELATED APPLICATION

This application claims the benefit of U.S. Provisional Application No. 62/553,083, filed Aug. 31, 2017, titled "SYSTEMS AND METHODS FOR LOAD BALANCING".

BACKGROUND

Aspects of embodiments of the present invention relate to the field of the management of computer systems, including managing the distribution of work across multiple computer systems. More specifically, the present invention pertains to load balancing across media server instances.

SUMMARY

A system and method are presented for load balancing across media server instances. In an embodiment, media is broken out into a multi-tenanted service allowing the media to be scaled independently of the number of organizations supported on a cloud-based collaboration platform. Scaling may occur in a scaling-out or a scaling-in operation. States for a media service may comprise in-service, quiescing, quiesced, failed, etc. The states may be used to monitor sessions associated with an instance and determine which media instances to terminate during a scaling-in operation. In an embodiment, new instances may be added to a collection of media instances in response to an increased workload in a scaling-out operation.

In one embodiment, a method is presented for load balancing a workload across a dynamically resized collection of computing resources providing long running services in a system for handling a media request, the method comprising the steps of: receiving, by a media manger, a request for a resource; selecting an instance of a group of instances, by a datastore operatively coupled to the media manager, wherein the instance meets a first criteria, and refraining from selecting any instance of the group of instances that meets a second criteria, each instance of the group being configured to maintain a collection of sessions associated with the instance meeting the first criteria by: in response to being forwarded the request, adding a session associated with the request to the collection of sessions; and in response to an instance state change, removing the session from the collection of sessions; detecting, by the media manager, a scaling-in operation within the sub-group of instances meeting the first criteria; transitioning at least one instance of the sub-group of instances meeting the first criteria to a sub-group of instances meeting the second criteria; maintaining each instance of the sub-group of instances meeting the second criteria while the collection of sessions associated with the instance meeting the second criteria comprises at least one session; and transitioning the instance meeting the second criteria to a sub-group of instances meeting a third criteria when the collection of sessions associated with the instance meeting the second criteria is empty.

DETAILED DESCRIPTION

Figure 1:
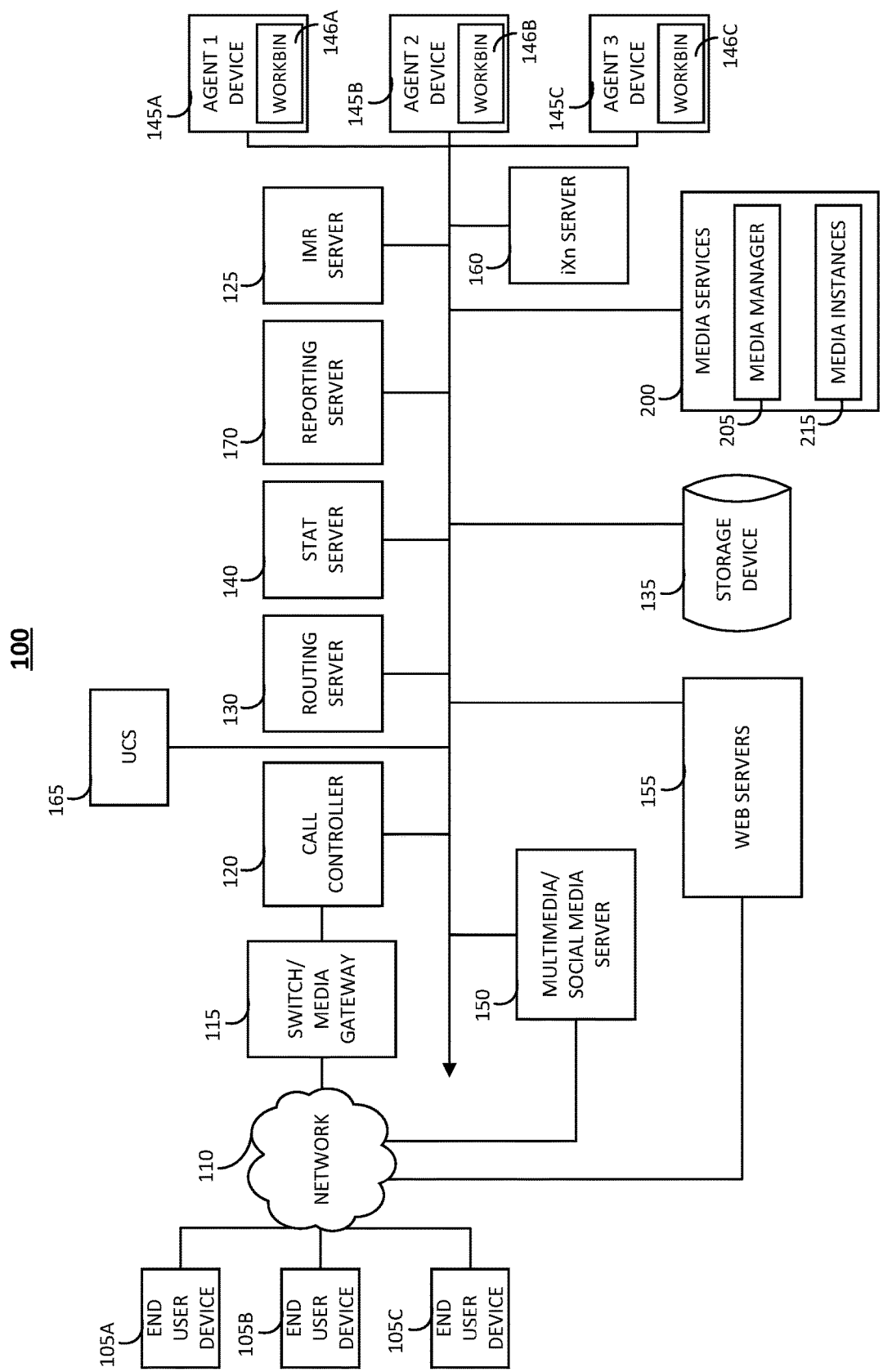
FIG. 1 is a diagram illustrating an embodiment of a communication infrastructure.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In the field of computing, workloads can be distributed across a collection of computing resources. For instance, requests for web pages may be distributed across multiple web servers. Using multiple computing resources rather than a single computing resource can improve reliability (e.g., by providing redundancy if a computing resource fails) and may also be more cost effective (e.g., operating one, more powerful computing resource may be more expensive than running multiple, less powerful computing resources).

A load balancer may perform the distribution of the workload across the collection of resources. For instance, the requests for web pages may initially be delivered to the load balancer, and the load balancer may forward the request to one of the computing resources (one of the instances) of the collection, as selected based on a workload distribution algorithm. The collection of computing resources may be static in some cases. The load balancer distributes the workload among the fixed collection of computing resources. When the workload is substantially constant, the size of the collection of resources can be set to a fixed value to meet the constant demand for computing services. However, if the workload varies over time, then the static collection of computing resources may not be properly sized for the changing workload. For example, when the workload is high, there may be insufficient computing resources to handle the workload, thereby increasing response times or potentially causing service outages. When the workload is low, there may be excess computing capacity, which may increase the cost of providing the computing services.

Aspects of embodiments of the present invention relate to systems and methods for load balancing across a collection of computing resources providing long running services, and for dynamically resizing the collection of computing resources. To address the issue of changing workload conditions, elastic computing systems may dynamically adjust (or scale) computing capacity in response to changes in workload. For example, as the workload increases, additional computing resources can be allocated or provisioned to handle the workload, in a process referred to as "scaling-out". Similarly, when the workload decreases, and the computing resources are no longer necessary, excess capacity can be deallocated or deprovisioned in order to reduce costs, in a process referred to as "scaling-in". These resizable groups of computing resources may be referred to as any of the following: dynamic groups, elastic groups, or auto-scaling groups.

For the sake of convenience, each of the computing resources in a collection may be referred to herein as an "instance". Each instance may correspond to, for example, a physical computer system (e.g., a processor, memory, and peripherals connected together by a system bus) or a virtual machine (e.g., a virtual private server, Docker containers, FreeBSD jails, and, instances provided by Infrastructure as a Service providers, such as Amazon Web Services). A collection of instances may be referred to as a "group".

A computing service may be provided by a group that includes one or more instances, where each instance may run a web application server (e.g., a Java application server such as Apache Tomcat) providing a web application (e.g., deployed on the Java application server as a Java Web Application Resource file). As more users access the computing service (e.g., a social network) during a particular time of day (e.g., in the evening), the workload increases, and additional instances may need to be allocated to the group in order to serve the increased workload. At a later time in the day (e.g., after many users have gone to sleep), the workload decreases, and instances can be deallocated from the group to reduce costs.

In many circumstances, long-running sessions may be established between the users and the instances. This may be referred to as "session affinity" or a "sticky session", where sessions are associated with combinations of users and instances, where the service is provided by the same instance throughout the course of the sticky session. For example, a user may log in to a computing service, and session information (e.g., the user's login status) may be stored on the instance itself. The data returned to a user in response to a request may depend on information stored on the instance (e.g., whether or not the user is logged in, and/or other actions the user has performed during the session). As another example, a user may stream media content such as audio and/or video, and, in order to provide smooth playback of the media content, it may be beneficial for all requests for the media content to be served by the same instance. Circumstances in which requests must be handled by particular instances will be referred to as "hard" constraints, and circumstances where it would be preferable for particular instances to handle requests will be referred to as "soft" constraints.

Deallocating instances during a scaling-in event may disrupt service for users having long-running sessions associated with the deallocated instances. As such, some aspects of embodiments are directed to systems and methods for maintaining long-running sessions in auto-scaling groups. For example, an embodiment of the present invention relates to systems and methods for scaling-in an auto-scaling group without losing long-running sessions by waiting for an instance that is marked for removal to arrive at a quiesced state (e.g., for all sessions associated with the instance to have ended) before terminating the instance.

Contact Center Systems

FIG. 1 is a diagram illustrating an embodiment of a communication infrastructure, indicated generally at 100.

For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 200, which may comprise a media manager 205 and media instances 215.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication. In this regard, each agent device 145 may include a telephone adapted for regular telephone calls, VoIP calls, etc. The agent device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non real-time interaction that uses any communication channel including, without limitation, telephony calls (PSTN or VoIP calls), emails, vmails, video, chat, screen-sharing, text messages, social media messages, WebRTC calls, etc.

As noted above, the contact center may operate as a hybrid system in which some or all components are hosted remotely, such as in a cloud-based environment. For the sake of convenience, aspects of embodiments of the present invention will be described below with respect to providing remotely hosted media services 200 in a cloud-based environment. In these examples, the media services 200 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting. As illustrated in FIG. 1, the media services 200 may include a media manager 205 configured to manage media instances 215, where the media manager 205 may receive requests for media services and may identify particular instances of the media instances 215 to provide the media services in response to the requests. The media manager 205 may also monitor the status of the media instances 215 (including the load conditions of the media instances 215) and add or remove instances to the media instances 215 in accordance with the status of the media instances 215.

However, embodiments of the present invention are not limited to media services such as the media services listed above and may also be applied to another service or other services. For example, the remotely hosted service may provide other services in association with long running sessions, such as video and audio streaming, screen recording, screen sharing, etc. Embodiments of the present invention are not limited to use with remotely hosted or cloud-based infrastructure. For example, embodiments of the present invention may also be applied in data centers operated directly by the contact center or within the contact center, where resources within the data center may be dynamically and programmatically allocated and/or deallocated from a group.

Figure 2:
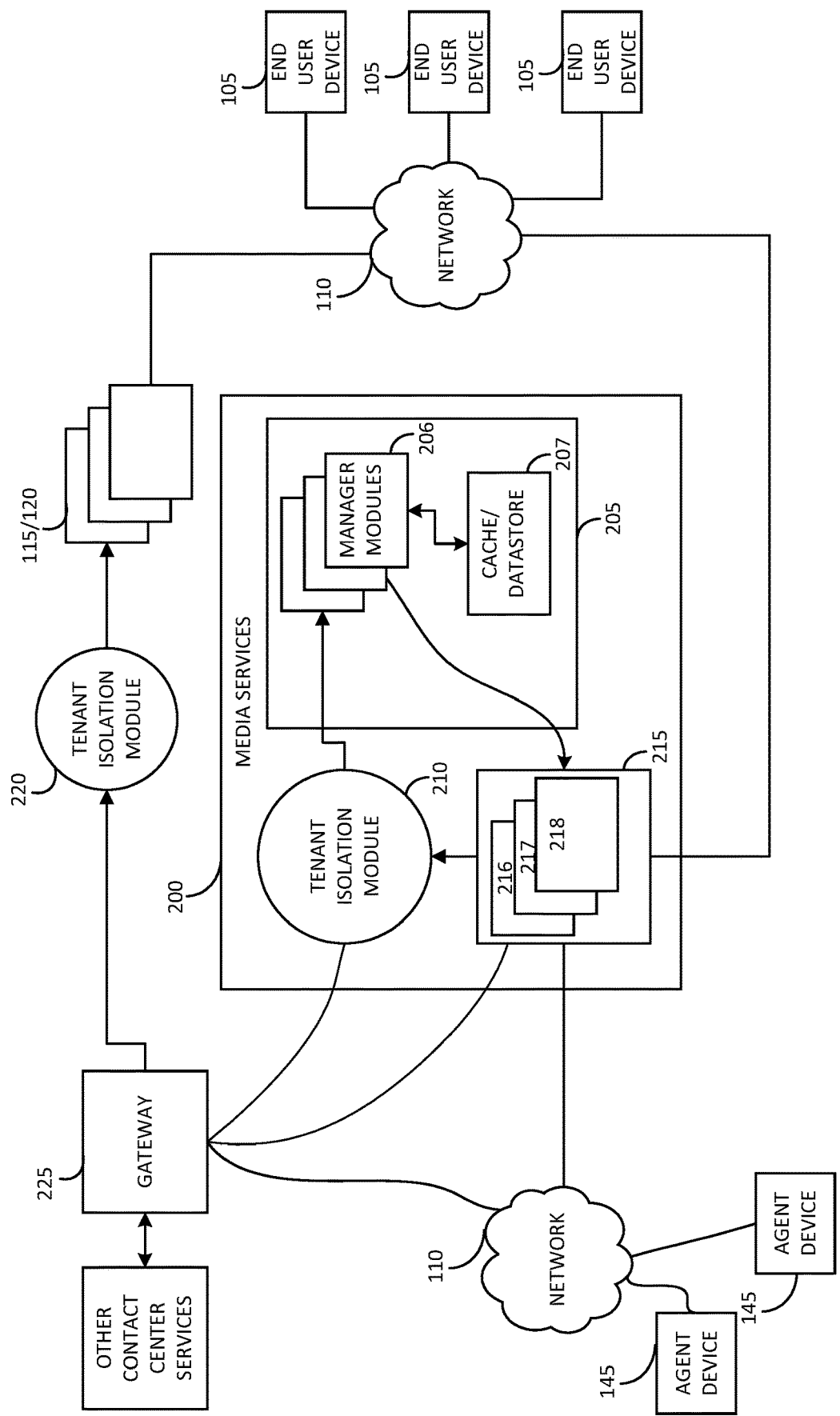
FIG. 2 is a diagram illustrating an embodiment of a cloud-based communication infrastructure.

FIG. 2 is a diagram generally illustrating an embodiment of a cloud-based communication infrastructure. In an embodiment, the infrastructure of FIG. 2 might include media services 200 managed by a load balancer. Like reference numerals in FIGS. 1 and 2 refer to like components. In an embodiment of FIG. 2, the media services 200 include a media manager 205 and media instances 215. The media manager 205 may include one or more manager modules 206 for managing the media instances 215 and may store information related to the media instances in a cache or datastore 207. The cache or datastore 207 may be implemented using, for example, a database, a key-value store (e.g., Redis, Amazon DynamoDB, or other NoSQL database), or other data storage service. For simplicity, media instances 215 are depicted in FIG. 2 as including three separate instances 216, 217, and 218, but embodiments of the present invention are not limited thereto and may have any number of instances.

In an embodiment, the media services 200 are operated in a multitenant environment, where multiple different tenants (e.g., different enterprises) may share the same hardware and/or installation of the media services software. However, embodiments of the present invention are not limited thereto and may also be applied in single-tenant environments. To provide multi-tenant support, a tenant isolation module 210 separates requests and other messages on a per-tenant basis and routes those requests accordingly. For example, in some embodiments, each of the manager modules 206 is associated with a particular tenant. Likewise, particular portions of the datastore 207 may be dedicated to particular tenants (e.g., all tenant data is associated with a prefix unique to the tenant). In the same way, a tenant isolation module 220 may provide isolation of tenant interactions with a call controller 120 and switch/media gateway 115.

The media services 200 may communicate with other contact center services via a gateway 225. Furthermore, the media services may communicate with agent devices 145 and end user devices 105 via the network 110.

The cache or datastore 207 may store information regarding the current status of the media instances 215. In an embodiment, monitoring software such as New Relic® Infrastructure or Amazon® CloudWatch may be used to monitor various load metrics related to the current load of the media instances 215. These load metrics may include, for example, central processing unit (CPU) utilization, memory usage, and network usage (e.g., each as percentages of maximum capacity). In addition, in some embodiments related to providing media services, the load metric may be calculated based on a combination of factors including CPU load ratio based on the number of cores on the machine, resource counts and types of resource (e.g., number of media endpoints), and memory ratio. The load metric is customized to characteristics of the application, such as in the case of media, where network bandwidth or memory may be more important limiting factors than CPU utilization.

The metrics may be periodically written to the datastore 207 in accordance with a heartbeat update process, such that the datastore 207 contains real-time or near real-time information about the state of the media instances 215 (e.g., every 30 seconds, every minute, every 5 minutes, etc.).

The media manager 206 identifies particular ones of the media instances 215 by adding and removing instances from media services based on the metrics stored in the datastore 207, by determining whether particular load conditions are met (as may also be specified in rules of the media manager 206). The rules may be customized on a per-tenant basis and may also or further be customized on a per-service basis.

For example, requests for media services may be received from various components of the contact center such as the IMR server 125, the multimedia/social media server 150, and an interaction/call recording server. The media manager 205 may store rules that indicate which instance of the media instances 215 should be used for the request. The request for media services may also include information for selecting an appropriate instance of the media instances 215 (e.g., organizational affinity in a multi-tenant environment or geographic location for selecting an instance that is physically close to the consumer of the media services).

Figure 3A:
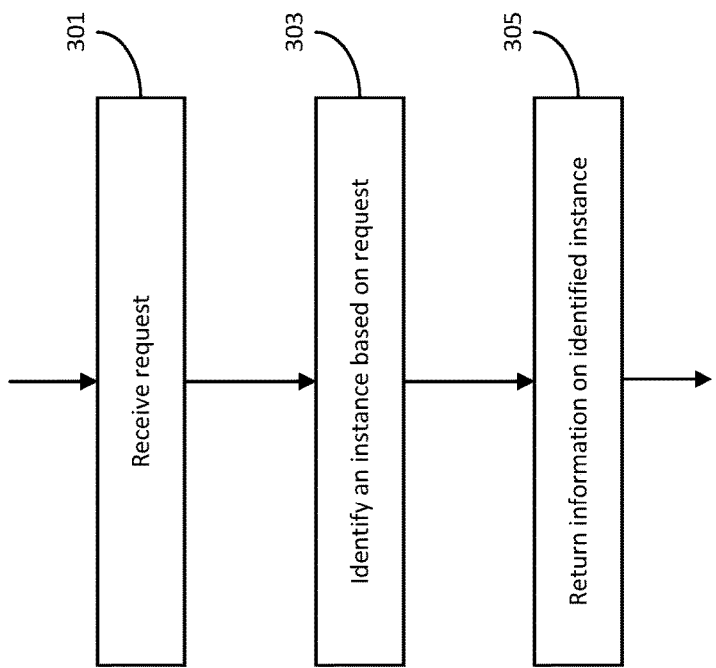
FIG. 3A is a flowchart illustrating an embodiment of a process for handling a request for a resource.
Figure 3B:
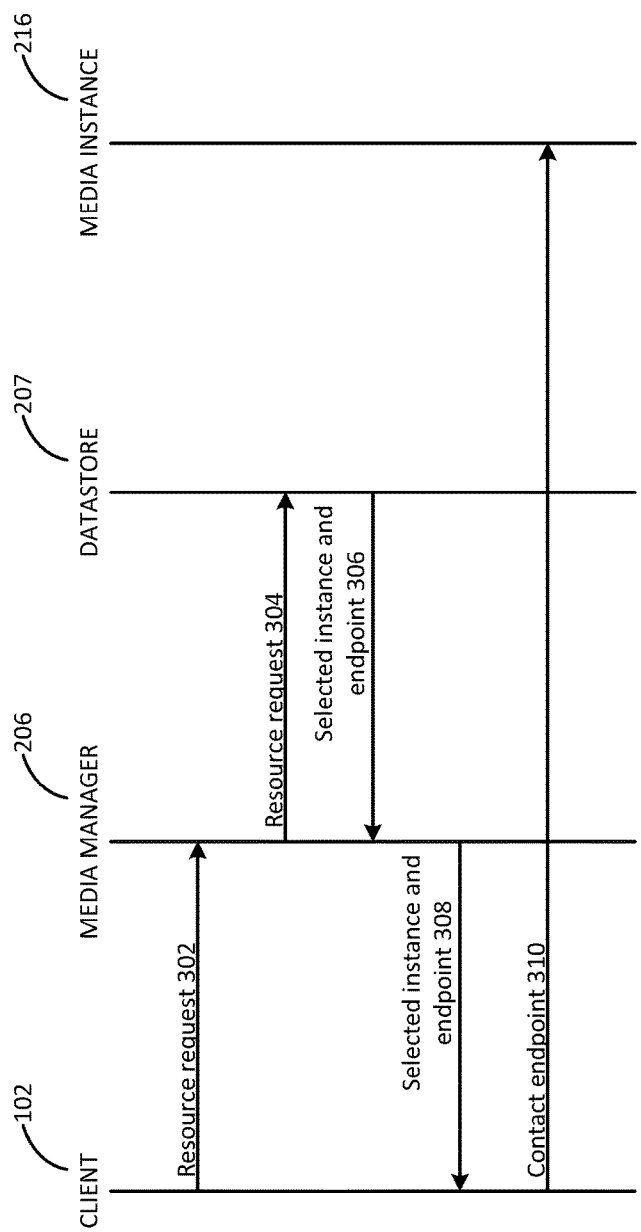
FIG. 3B is a diagram illustrating an embodiment of a process for requesting a resource.

FIG. 3A is a flowchart illustrating an embodiment of a process for handling a request for a resource, indicated generally at 300A. FIG. 3B is a diagram illustrating an embodiment of a process for requesting a resource, indicated generally at 300B. Referring to FIGS. 3A and 3B, a client 102 (e.g., another contact center resource such as the IMR server 125 or the call controller 120) may access the media services 200 via the gateway 225. A client 102 may request a resource from the media services 200 by sending a resource request 302 to the media manager 206. The resource request 302 may include information such as the particular resource requested (e.g., a particular media service such as hold music or audio recording) and, in the case of a multi-tenant environment, the identity of the tenant requesting the resource.

After the media manager 206 receives 301 the request, the media manager sends a resource request 304 to the datastore 207 to identify or select 303 an appropriate instance from among the collection of media instances 215 to provide the resource or service. As will be discussed in more detail below, each of the instances of the media instances 215 may be in one of a number of different states. In an embodiment, when identifying or selecting 303 an appropriate instance, the selection process considers only instances that are in the "in-service" state (e.g., instances that are members of the sub-group of in-service instances). The selection process refrains from selecting an instance among the instances that are in the other states, such as the "quiescing" state (e.g., instances that are members of the sub-group of quiescing instances). The selection process may also refrain from selecting instances in other states, including the quiesced state, the init state, the failed state, and the terminated state, to name a few non-limiting examples.

In an embodiment, an instance may be selected based on the load metrics associated with the instances in the datastore 207. Information about the instances (e.g., the IP addresses of the instances) may be stored in a sorted data structure of the datastore 207 (e.g., the Sorted Sets data type of Redis), where the instances may be sorted in accordance with their corresponding load metrics. In an embodiment, an instance may be selected from among those instances that have available capacity to handle the request (e.g., excluding instances that would be overloaded if they were to provide the requested service). This may be referred to as being a "hard" constraint.

In an embodiment, different algorithms may be used to select one of the instances having available capacity (these may be referred to as "soft" constraints). In an embodiment, a "bin packing" approach is used, where the instance having the highest load (e.g., highest CPU utilization level or highest network load) is selected. In yet another embodiment, using a "stochastic" approach, one of the instances is randomly selected, where more heavily loaded instances are given higher weight along an exponential distribution.

In an embodiment using an "N−1" approach, the second to least loaded instance is selected, refraining from selecting the least loaded instance in order to keep it available as a reserve. In an embodiment using an "N−1 stochastic" approach, the same approach of refraining from selecting the least loaded instance is used and an instance is selected randomly from the remaining instances. More lightly loaded instances may be given higher weight along an exponential distribution. In an embodiment using an "N−1 weighted" approach, the same approach of refraining from selecting the least loaded instance is used and an instance may further be randomly selected from the remaining instances where more lightly loaded instances are given higher weight along a linear distribution.

In an embodiment using a "balanced" approach, the least loaded instance is selected. In another embodiment using a "balanced stochastic" approach, an instance is selected randomly from the remaining instances where more lightly loaded instances are given higher weight along an exponential distribution. In an embodiment using a "balanced weighted" approach, an instance is selected randomly from the remaining instances where more lightly loaded instances are given higher weight along a linear distribution.

From among the in-service instances, the selection of a particular instance may also be restricted based on tenant affinity. For example, to provide additional isolation between tenants, the selection may be limited to instances that are providing media services to the particular tenant from which the request originated.

In an embodiment, the tenant affinity is a factor in the selection of an instance based on a request from a particular instance. For example, instances that are providing services to that particular tenant may be preferred over other instances, but if those instances already have high workloads and if the quality of the service would be degraded by increasing the workload on those instances, then another instance (e.g., an instance not already supporting the particular tenant) may be selected instead.

After the datastore 207 has selected a particular media instance to handle the request, the datastore 207 returns information 306 about the selected instance and endpoint (e.g., IP address) of the selected instance (in this example, media instance 216) to the media manager 206. The media manager 206 returns 305 the information 308 about the selected instance to the client 102. The client 102 directly contacts 310 the media instance 216 to establish a session to receive the requested resource or service.

Instance Lifecycle

Figure 4:
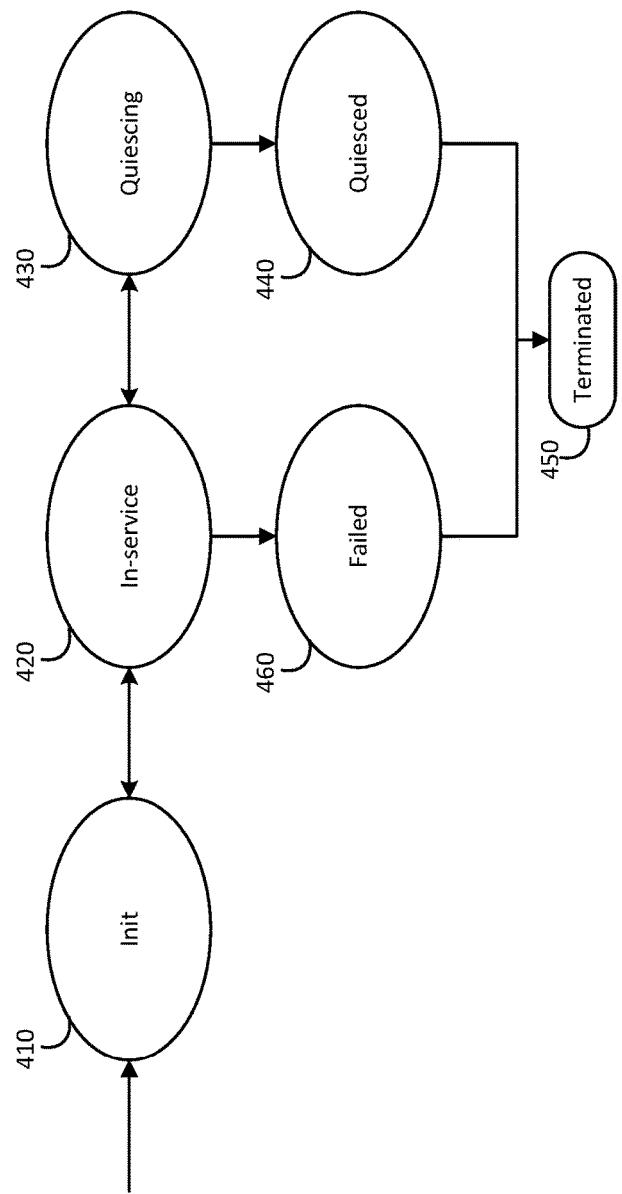
FIG. 4 is a diagram illustrating an embodiment of states of an instance.

FIG. 4 is a diagram illustrating an embodiment of states of an instance, indicated generally at 400. In an embodiment, the state diagram illustrates states of an instance during its lifecycle as managed by a media manager and transitions that the instances may make between the states. When an instance is first started (e.g., booted up), it is put into the init state 410 (e.g., a warming up state, an initializing instance, or a booting instance). While in the init state 410, various aspects of the instance may be initialized in preparation to perform work, and such initialization may include loading device drivers, loading application software into memory, reading configuration files, obtaining IP address(es), connecting to services, registering with the media manager 206, etc. New instances may be started when the media service as a whole is first started, as well as when a scaling-out event occurs, where one or more media instances are added to a collection of media instances in response to an increased workload, as described in more detail below.

After the initialization is complete, the media manager 206 transitions the instance to the in-service state 420 (an in-service instance), indicating that the instance is ready to handle requests. While in the in-service state 420, the media manager 206 may forward requests to the instance, as described above, and the instance may handle those requests by establishing communications sessions with client services. Each request may be associated with a separate session, and a collection of active sessions may be stored by the instance (e.g., in the memory of the instance) for the duration of the session. When the session is complete (e.g., when the session has ended), the session is removed from the collection of active sessions stored by the instance. A such, each instance stores information about the active sessions associated with the clients to which it is providing services.

As a more concrete example, an instance may receive a request to provide an audio recording service to an audio conference. As such, a session may be established with a connection to a call controller, where the instance records audio from an end user device 105 and an agent device 145 that are engaged in an interaction (e.g., a telephone call). After the interaction is complete (e.g., after the end user hangs up the phone), the instance completes the providing of the service (e.g., by writing the recorded audio to persistent storage), and removes the completed session from the collection of active sessions.

In another embodiment, an instance may receive a request to provide hold music to an end user device 105 that is waiting for the next available agent. In response to this request, the instance adds a session to its collection of active sessions and begins to stream music to the end user device 105. When the end user device 105 is connected to an agent, the instance stops the music stream for the session and removes the session from the list of active sessions. As such, the sessions handled by the instances 215 may generally be long running (e.g., several minutes to several hours), but are not expected to run indefinitely (which will be referred to herein as being sessions having finite duration). These sessions may be contrasted with, for example, session-less circumstances (e.g., where a single response is delivered in response to a request and no session information is stored in association with the request) or services expected to run indefinitely (e.g., a persistent database connection between a webserver and a database is maintained and persists between separate queries).

In some circumstances, the instance may be reconfigured or may otherwise require restart (e.g., due to software updates, changes in configuration parameters, etc.) in which case the media manager 205 may transition the instance to the init state 410 while the reconfiguration and restart processes are being performed.

When an instance is shut down or released from the collection of media instances 215 (e.g., when there is significantly excess capacity) in a scale-in event (as described in greater detail below), then the instance may be transitioned to a quiescing state 430 (a quiescing instance). While in the quiescing state, any sessions still being handled by the instance continue to be serviced. In addition, the media manager 205 may stop monitoring the load metrics associated with the quiescing instance. After all of the sessions associated with the instance have ended, the media manager 205 transitions the instance to a quiesced state 440. Instances in the quiesced state 440 (or "quiesced instances") may then be terminated 450 (e.g., "powered off" or released from the group for use by other services). The transition from a quiesced state 440 to a terminated state 450 (or "terminated instance") may be performed by a garbage collection system that periodically terminates all quiesced instances.

In some cases, an instance may fail, such as in the case of an unrecoverable error condition by the software (e.g., data inconsistencies triggering assertion failures, bugs in the software leading to uncaught exceptions, segmentation faults, kernel panics, intrusions such as buffer overflow attacks, etc.). Hardware failures (e.g., memory corruption, network adapter failure, overheating, etc.) may also occur. In such examples of error or failure, the instance may be transitioned to a failed state 460 (a failed instance), removed from the group, and be terminated 450. In addition, a report may be automatically generated for the system administrators to investigate the failure, where the report may include logs, memory dumps, etc.

During operation, various sub-groups of the media instances 215 may be in various states. For example, during normal operations, some of the instances may be in the in-service state 420 and will therefore be referred to as members of the in-service sub-group. At various times during operation, one or more of the sub-groups may be empty. For example, in an embodiment, all the instances will be in the in-service state 420 and none of the instances will be in any of the other states (e.g., the init state 410, the quiescing state 430, the quiesced state 440, and the failed state 460).

Figure 5:
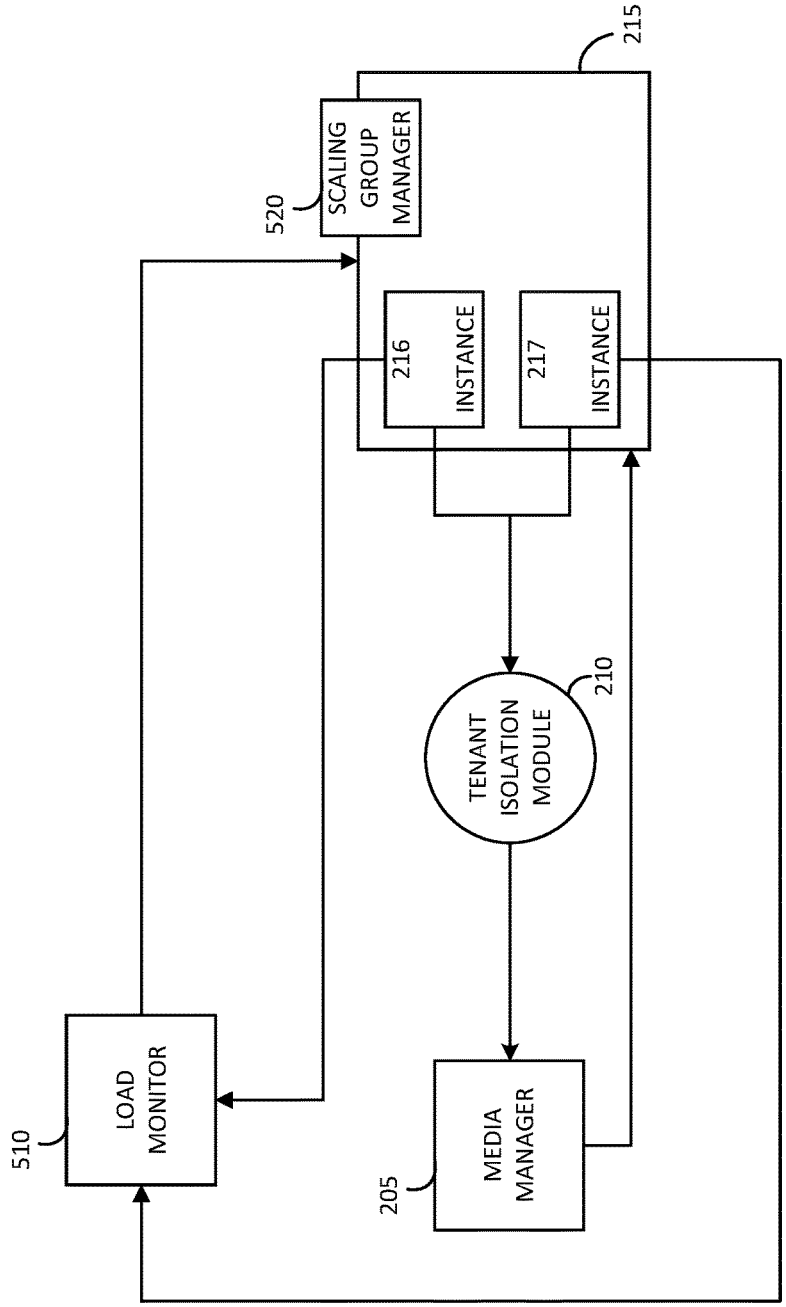
FIG. 5 is a diagram illustrating an embodiment of the management of a group of instances.

FIG. 5 is a diagram illustrating an embodiment of the management of a group of instances, indicated generally at 500. In an embodiment, the management may be accordance with the status metrics of the instances. As shown in FIG. 5, a load monitor 510 may collect load metrics from the media instances 215, such as instances 216 and 217. These load metrics may include, for example, CPU utilization, memory usage, and network usage (e.g., each as percentages of maximum capacity). When the value or values of one or more of the load metrics satisfy a threshold level, such as when the CPU utilization of all of the media instances exceeds an upper threshold (such as 90%, for example), then a scaling event (e.g., a scale-out event or a scale-in event) may be triggered. When the scaling event is triggered, the load monitor 510 sends a trigger to the scaling group manager 520 (which may also be a component of the media manager 205, in an embodiment) to perform a scaling event by, for example, setting a new target number of instances of the collection of media instances (e.g., setting a target size of the auto-scaling group to be different from the current size of the auto-scaling group).

A scaling-out event corresponds to the case where the target size of the auto-scaling group is greater than the current size of the group. In this case, one or more instances may be initialized (e.g., put into the init state 410) and eventually transitioned into the in-service state 420 in order to service requests forwarded from the media manager 205.

Likewise, a scaling-in event corresponds to the case where the new target size of the auto-scaling group is smaller than the current size of the group. In this scenario, in order to avoid causing service interruptions to clients, one or more instances will be transitioned to the quiescing state 430 and then the quiesced state 440 before being terminated 450.

Figure 6:
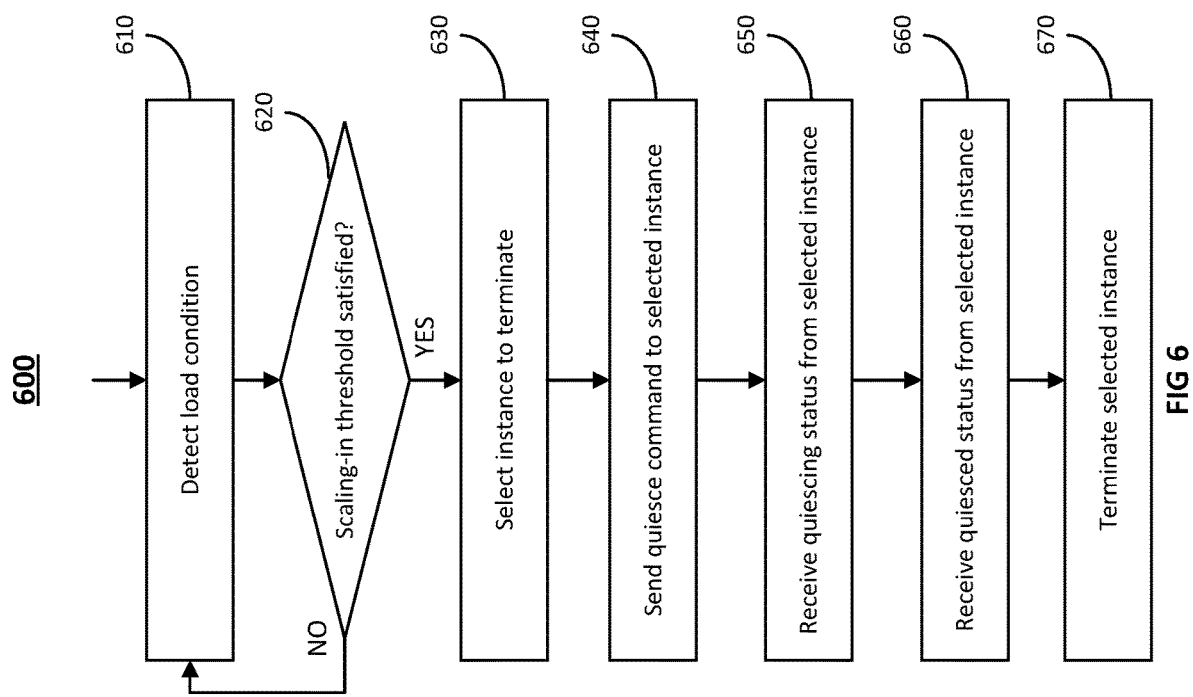
FIG. 6 is a flowchart illustrating an embodiment of a process for scaling a group of instances.
Figure 7:
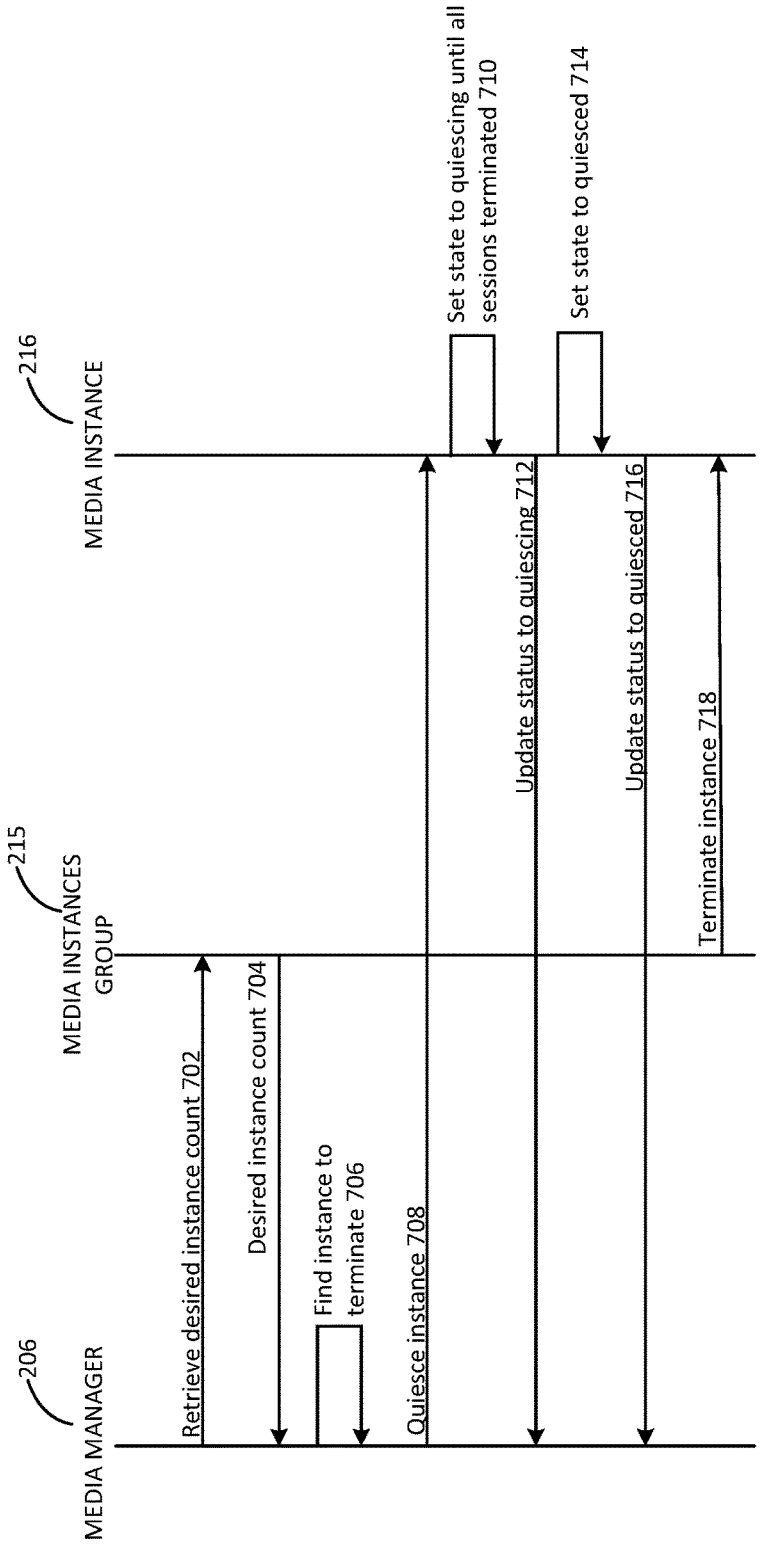
FIG. 7 is a diagram illustrating an embodiment of a process for scaling a group of instances.

FIG. 6 is a flowchart illustrating an embodiment of a process for scaling a group of instances, indicated generally at 600. In an embodiment of FIG. 6, groups of instances having long running services may be scaled-in or scaled-down. FIG. 7 is a diagram illustrating an embodiment of a process for scaling a group of instances, indicated generally at 700.

Referring to FIGS. 5, 6, and 7, in operation 610, the load monitor 510 detects a load condition in the media instances 215 and, in operation 620, determines whether a scaling-in threshold has been satisfied or met. If the threshold has not been satisfied or met, then the process loops back to operation 610 to continue monitoring the load conditions of the media instances 215. However, if the scaling-in threshold has been met (e.g., there are more in-service instances running than needed for the current load and more than desired), then a message may be sent to the media manager 206 to scale down the group of media instances. In an embodiment, the media manager 206 may have sent a message 702 to retrieve the desired instance count from the media instances group 215. The media instances group 215 returns a desired instance count 704 to the media manger 206. In an embodiment, the load monitor 510 may be a component of the media manager 206.

In operation 630, the media manager 206 finds a media service to terminate 706. In an embodiment, the media manager 206 quiesces an instance only if a "desired instance count" (or target instance count) is less than the number of active media instances (e.g., the number of in-service instances in the group of media instances 215).

In an embodiment, the instances may be spread among multiple "availability zones" that are substantially independent for purposes of redundancy (e.g., located in different physical locations, with different sources of power, and with different connections to an Internet backbone). In some such embodiments, an instance may be chosen from the availability zone that has the largest number of media instances (in order to increase the likelihood that at least one instance continues to run in each availability zone).

In an embodiment, if there is more than one instance to choose from, then the media service instance having the least load will be selected for termination. Information about the current loads of the media instances may be retrieved from the datastore 207. If there are multiple such instances, then the oldest media instance (e.g., the longest uptime) is selected for termination.

In operation 640, the media manager 206 sends a quiesce command 708 to the instance that was selected in operation 630. The selected media instance (in this example, media instance 216) sets 710 its own state to the quiescing state 430 and reports 712 its updated state to the media manager 206, which receives the updated state in operation 650. As described above, the media instance 216 remains in the quiescing state until all of its active sessions have terminated. The media manager 206 refrains from selecting any media instances that are in the quiescing state to handle any new incoming requests. Because the sessions are assumed to have a finite length, all sessions handled by the selected media instance 216 will eventually end.

After all active sessions of the selected media instance 216 have ended, the selected media instance 216 sets 714 its state to the quiesced state 440 and reports 716 its updated state to the media manager 206. In the case where embodiments of the present invention are implemented on Amazon® Web Services (AWS), "instance protection" may be enabled on the media instances in order to protect instances 215 from being terminated outside of the control of the media manager 206. When transitioning an instance from the quiescing state 430 to the quiesced state 440, the instance protection can be removed, thereby allowing the instance to be properly terminated. In addition, the instance may also configure itself to return the 503 "Service Unavailable" HTTP Status code in response to health checks.

In operation 660, the media manager 206 receives the message that the selected media instance 216 has entered the quiesced state 440. The selected instance may then be terminated 718 in operation 670 (in some embodiments, the termination is performed automatically by a "garbage collection" process that terminates quiesced instances, such as by the media instances group 215).

As such, embodiments of the present invention provide for the graceful scaling-in of autoscaling groups or dynamically scaled groups of instances, without interrupting the service of long running sessions, by allowing the instances to quiesce and to finish serving those long running sessions before being terminated.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 8A, 8B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
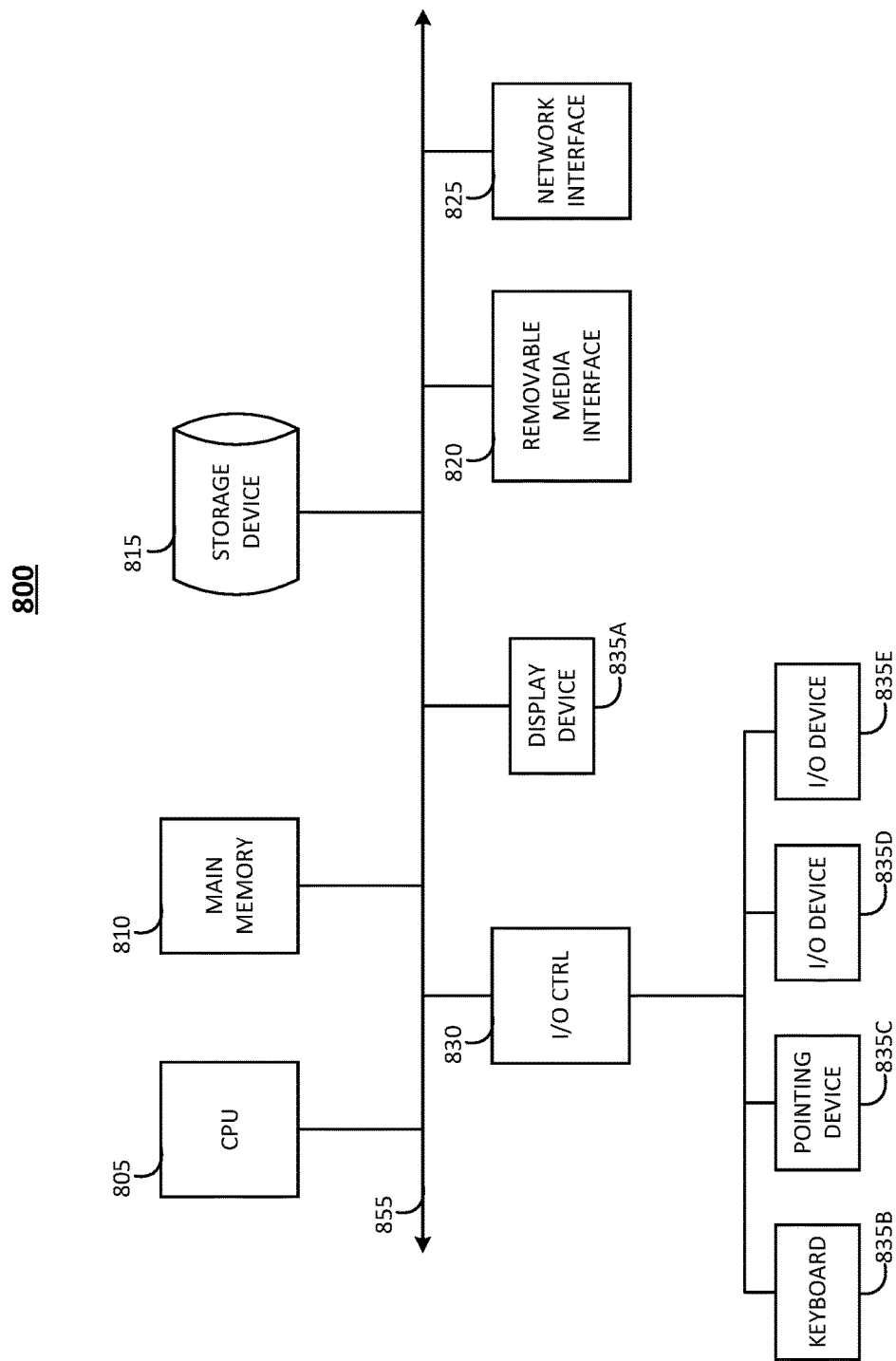
FIG. 8A is a diagram illustrating an embodiment of a computing device.
Figure 8B:
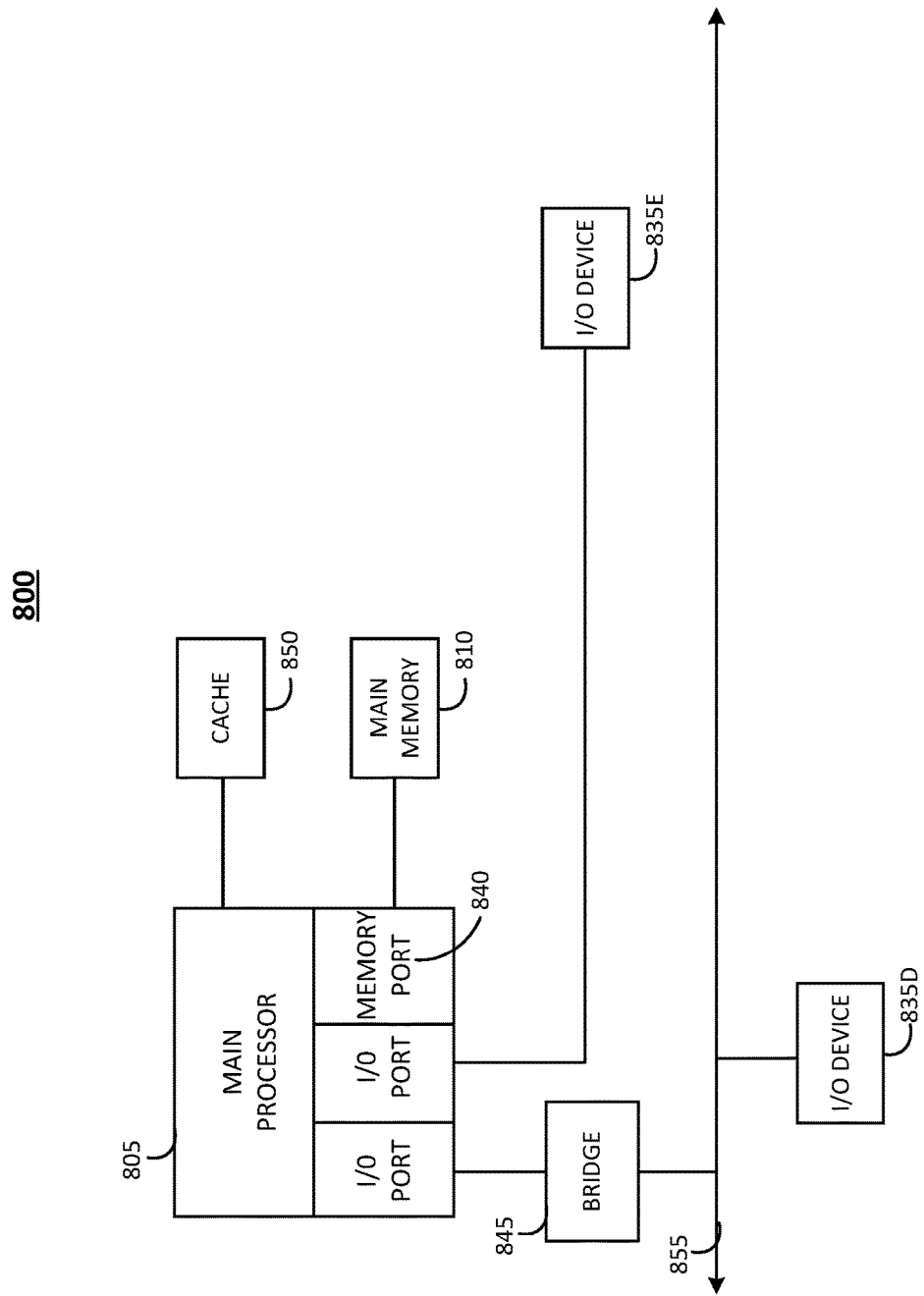
FIG. 8B is a diagram illustrating an embodiment of a computing device.

FIGS. 8A and 8B are diagrams illustrating an embodiment of a computing device as may be employed in an embodiment of the invention, indicated generally at 800. Each computing device 800 includes a CPU 805 and a main memory unit 810. As illustrated in FIG. 8A, the computing device 800 may also include a storage device 815, a removable media interface 820, a network interface 825, an input/output (I/O) controller 830, one or more display devices 835A, a keyboard 835B and a pointing device 835C (e.g., a mouse). The storage device 815 may include, without limitation, storage for an operating system and software. As shown in FIG. 8B, each computing device 800 may also include additional optional elements, such as a memory port 840, a bridge 845, one or more additional input/output devices 835D, 835E, and a cache memory 850 in communication with the CPU 805. The input/output devices 835A, 835B, 835C, 835D, and 835E may collectively be referred to herein as 835.

The CPU 805 is any logic circuitry that responds to and processes instructions fetched from the main memory unit 810. It may be implemented, for example, in an integrated circuit, in the form of a microprocessor, microcontroller, or graphics processing unit, or in a field-programmable gate array (FPGA) or application-specific integrated circuit (ASIC). The main memory unit 810 may be one or more memory chips capable of storing data and allowing any storage location to be directly accessed by the central processing unit 805. As shown in FIG. 8A, the central processing unit 805 communicates with the main memory 810 via a system bus 855. As shown in FIG. 8B, the central processing unit 805 may also communicate directly with the main memory 810 via a memory port 840.

In an embodiment, the CPU 805 may include a plurality of processors and may provide functionality for simultaneous execution of instructions or for simultaneous execution of one instruction on more than one piece of data. In an embodiment, the computing device 800 may include a parallel processor with one or more cores. In an embodiment, the computing device 800 comprises a shared memory parallel device, with multiple processors and/or multiple processor cores, accessing all available memory as a single global address space. In another embodiment, the computing device 800 is a distributed memory parallel device with multiple processors each accessing local memory only. The computing device 800 may have both some memory which is shared and some which may only be accessed by particular processors or subsets of processors. The CPU 805 may include a multicore microprocessor, which combines two or more independent processors into a single package, e.g., into a single integrated circuit (IC). For example, the computing device 800 may include at least one CPU 805 and at least one graphics processing unit.

In an embodiment, a CPU 805 provides single instruction multiple data (SIMD) functionality, e.g., execution of a single instruction simultaneously on multiple pieces of data. In another embodiment, several processors in the CPU 805 may provide functionality for execution of multiple instructions simultaneously on multiple pieces of data (MIMD). The CPU 805 may also use any combination of SIMD and MIMD cores in a single device.

FIG. 8B depicts an embodiment in which the CPU 805 communicates directly with cache memory 850 via a secondary bus, sometimes referred to as a backside bus. In other embodiments, the CPU 805 communicates with the cache memory 850 using the system bus 855. The cache memory 850 typically has a faster response time than main memory 810. As illustrated in FIG. 8A, the CPU 805 communicates with various I/O devices 835 via the local system bus 855. Various buses may be used as the local system bus 855, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 835A, the CPU 805 may communicate with the display device 835A through an Advanced Graphics Port (AGP). FIG. 8B depicts an embodiment of a computer 800 in which the CPU 805 communicates directly with I/O device 835E. FIG. 8B also depicts an embodiment in which local buses and direct communication are mixed: the CPU 805 communicates with I/O device 835D using a local system bus 855 while communicating with I/O device 835E directly.

A wide variety of I/O devices 835 may be present in the computing device 800. Input devices include one or more keyboards 835B, mice, trackpads, trackballs, microphones, and drawing tables, to name a few non-limiting examples. Output devices include video display devices 835A, speakers and printers. An I/O controller 830 as shown in FIG. 8A, may control the one or more I/O devices, such as a keyboard 835B and a pointing device 835C (e.g., a mouse or optical pen), for example.

Referring again to FIG. 8A, the computing device 800 may support one or more removable media interfaces 820, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 835 may be a bridge between the system bus 855 and a removable media interface 820.

The removable media interface 820 may, for example, be used for installing software and programs. The computing device 800 may further include a storage device 815, such as one or more hard disk drives or hard disk drive arrays, for storing an operating system and other related software, and for storing application software programs. Optionally, a removable media interface 820 may also be used as the storage device. For example, the operating system and the software may be run from a bootable medium, for example, a bootable CD.

In an embodiment, the computing device 800 may include or be connected to multiple display devices 835A, which each may be of the same or different type and/or form. As such, any of the I/O devices 835 and/or the I/O controller 830 may include any type and/or form of suitable hardware, software, or combination of hardware and software to support, enable or provide for the connection to, and use of, multiple display devices 835A by the computing device 800. For example, the computing device 800 may include any type and/or form of video adapter, video card, driver, and/or library to interface, communicate, connect or otherwise use the display devices 835A. In an embodiment, a video adapter may include multiple connectors to interface to multiple display devices 835A. In another embodiment, the computing device 800 may include multiple video adapters, with each video adapter connected to one or more of the display devices 835A. In other embodiments, one or more of the display devices 835A may be provided by one or more other computing devices, connected, for example, to the computing device 800 via a network. These embodiments may include any type of software designed and constructed to use the display device of another computing device as a second display device 835A for the computing device 800. One of ordinary skill in the art will recognize and appreciate the various ways and embodiments that a computing device 800 may be configured to have multiple display devices 835A.

An embodiment of a computing device indicated generally in FIGS. 8A and 8B may operate under the control of an operating system, which controls scheduling of tasks and access to system resources. The computing device 800 may be running any operating system, any embedded operating system, any real-time operating system, any open source operation system, any proprietary operating system, any operating systems for mobile computing devices, or any other operating system capable of running on the computing device and performing the operations described herein.

The computing device 800 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 800 may have different processors, operating systems, and input devices consistent with the device.

In other embodiments, the computing device 800 is a mobile device. Examples might include a Java-enabled cellular telephone or personal digital assistant (PDA), a smart phone, a digital audio player, or a portable media player. In an embodiment, the computing device 800 includes a combination of devices, such as a mobile phone combined with a digital audio player or portable media player.

A computing device 800 may be one of a plurality of machines connected by a network, or it may include a plurality of machines so connected. A network environment may include one or more local machine(s), client(s), client node(s), client machine(s), client computer(s), client device (s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 800 communicates with other computing devices 800 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for load balancing a workload across a dynamically resized collection of computing resources providing long running services in a system for handling a media request, the method comprising the steps of:
    receiving, by a media manager, a request for a resource;
    selecting an instance of a group of instances, by a datastore operatively coupled to the media manager, wherein the instance meets a first criteria, and refraining from selecting any instance of the group of instances that meets a second criteria, each instance of the group being configured to maintain a collection of sessions associated with the instance meeting the first criteria by:

in response to being forwarded the request, adding a session associated with the request to the collection of sessions; and in response to an instance state change, removing the session from the collection of sessions;

detecting, by the media manager, a scaling-in operation within a sub-group of instances meeting the first criteria;

transitioning at least one instance of the sub-group of instances meeting the first criteria to a sub-group of instances meeting the second criteria;

maintaining each instance of the sub-group of instances meeting the second criteria while the collection of sessions associated with the instance meeting the second criteria comprises at least one session; and transitioning the instance meeting the second criteria to a sub-group of instances meeting a third criteria when the collection of sessions associated with the instance meeting the second criteria is empty.

2. The method of claim 1, wherein the instance meeting the first criteria comprises an in-service instance.

3. The method of claim 1, wherein the instance meeting the second criteria comprises a quiescing instance, wherein the quiescing instances further comprises a quiescing state.

4. The method of claim 1, wherein the instance meeting the third criteria comprises a quiesced instance.

5. The method of claim 1, further comprising terminating instances in the sub-group of instances meeting the third criteria.

6. The method of claim 5, wherein the termination is performed by one of: the instance itself directly or through a third-party process.

7. The method of claim 3, wherein the quiescing state is indefinite.

8. The method of claim 3, wherein the quiescing state ends after a pre-determined interval of time.

9. The method of claim 3, wherein the quiescing state is ended by an explicit stimulus.

10. The method of claim 9, wherein the explicit stimulus comprises at least one of: session ending, disconnection, resource expiration, and time expiration.

11. The method of claim 1, wherein an instance is selected based on load metrics associated with the instances in the datastore.

12. The method of claim 11, further comprising:
determining that the load metric satisfies a threshold;
determining that the sub-group of instances meeting the second criteria comprises at least one instance; and
transitioning at least one instance from the sub-group of instances meeting the second criteria to the sub-group of instances meeting the first criteria.

13. The method of claim 1, wherein the workload comprises real-time media streams of indeterminate duration.

14. The method of claim 13, wherein the media streams comprise at least one of: email, vmail, chat, video, text-messaging, web, social media, and co-browsing.

15. The method of claim 1, wherein the instance state change comprises a comparison by the media manager of a current state with a prior state of the instance.

16. The method of claim 1, wherein the detected scaling-in operation comprises a load condition which satisfies a scaling-in threshold.

17. The method of claim 16, wherein the detecting of the satisfied load condition is performed by a monitoring service wherein the monitoring service monitors computing load.

18. The method of claim 17, wherein the monitoring service is a third-party service.

19. The method of claim 1, wherein the transitioning is performed by the instance itself.

* * * * *